(12) United States Patent
Zhao et al.

(10) Patent No.: US 12,428,536 B2
(45) Date of Patent: Sep. 30, 2025

(54) HEAT-EXPANDABLE POLYVINYLIDENE CHLORIDE MICROSPHERE AND ITS PREPARATION METHOD

(71) Applicants: ZHEJIANG QUZHOU JUSU CHEMICAL INDUSTRY CO., LTD, Zhejiang (CN); ZHEJIANG JUHUA CO., LTD.ELECTROCHEMISTRY PLANT, Zhejiang (CN)

(72) Inventors: Xinben Zhao, Zhejiang (CN); Yupeng Wu, Zhejiang (CN); Zhigang Wu, Zhejiang (CN); Jinming Han, Zhejiang (CN); Lanhui Su, Zhejiang (CN); Yudeng Chai, Zhejiang (CN); Congli Ma, Zhejiang (CN); Hongxin Zhou, Zhejiang (CN); Gang Su, Zhejiang (CN); Junming Lu, Zhejiang (CN)

(73) Assignees: ZHEJIANG QUZHOU JUSU CHEMICAL INDUSTRY CO., LTD, Zhejiang (CN); ZHEJIANG JUHUA CO., LTD. ELECTROCHEMISTRY PLANT, Zhejiang (CN)

(*) Notice: Subject to any disclaimer, the term of this patent is extended or adjusted under 35 U.S.C. 154(b) by 749 days.

(21) Appl. No.: 17/765,845

(22) PCT Filed: Jun. 22, 2021

(86) PCT No.: PCT/CN2021/101495
§ 371 (c)(1),
(2) Date: Apr. 1, 2022

(87) PCT Pub. No.: WO2022/041978
PCT Pub. Date: Mar. 3, 2022

(65) Prior Publication Data
US 2022/0372240 A1  Nov. 24, 2022

(30) Foreign Application Priority Data

Aug. 25, 2020 (CN) .......................... 202010862138.8
Aug. 25, 2020 (CN) .......................... 202010862651.7

(51) Int. Cl.
*C08J 9/20* (2006.01)
*C08F 214/08* (2006.01)
(Continued)

(52) U.S. Cl.
CPC ............... *C08J 9/20* (2013.01); *C08F 214/08* (2013.01); *C08J 9/0066* (2013.01); *C08J 9/141* (2013.01);
(Continued)

(58) Field of Classification Search
CPC ... C08J 9/20; C08J 9/0066; C08J 9/141; C08J 2203/14; C08J 2203/182; C08J 2203/22;
(Continued)

(56) References Cited

U.S. PATENT DOCUMENTS 3,615,972 A  10/1971  Morehouse, Jr. et al.
3,945,956 A   3/1976  Garner
(Continued)

FOREIGN PATENT DOCUMENTS

CN  102633936   8/2012
CN  102746454   10/2012
(Continued)

OTHER PUBLICATIONS

CN110922631A Machine Translation (Year: 2020).*
(Continued)

*Primary Examiner* — K. Boyle
(74) *Attorney, Agent, or Firm* — JCIPRNET

(57) ABSTRACT

Disclosed are a heat-expandable polyvinylidene chloride microsphere and its preparation method. The preparation
(Continued)

method comprises: by weight, dissolving 250 to 550 parts of an aqueous-phase polymerization inhibitor, 20 to 100 parts of a dispersant, and 3 to 15 parts of a co-dispersing monomer in deionized water, adjusting a pH value of the solution and cooling the solution to obtain an aqueous phase for later use; dissolving 5 to 15 parts of a cross-linking agent and 20 to 45 parts of an initiator in 1000 to 2000 parts of a mixed monomer, and cooling the solution to obtain an oil phase for later use; mixing and homogenizing the aqueous phase and the oil phase with stirring to obtain a homogenized mixed solution; adding 300 to 550 parts of a foaming agent to the homogenized mixed solution and homogenizing the resulting solution with stirring to obtain a homogenized mixed solution containing the foaming agent; reacting the homogenized mixed solution containing the foaming agent with stirring; at the end of the reaction, cooling to room temperature, filtering the resulting suspension to obtain filtrate, centrifuging and dehydrating the filtrate, and drying to obtain the heat-expandable polyvinylidene chloride microsphere product. This disclosure has the advantages of simple process and environmental friendliness, and the obtained product has good performance.

9 Claims, 1 Drawing Sheet

(51) Int. Cl.
*C08J 9/00* (2006.01)
*C08J 9/14* (2006.01)

(52) U.S. Cl.
CPC ....... *C08F 2800/20* (2013.01); *C08J 2203/14* (2013.01); *C08J 2203/182* (2013.01); *C08J 2203/22* (2013.01); *C08J 2327/08* (2013.01)

(58) Field of Classification Search
CPC ........ C08J 2327/08; C08J 9/32; C08F 214/08; C08F 2800/20; C08F 214/10; C08F 220/42; C08F 2/00; C08F 2/18; C08F 20/42; C08F 14/08; C08F 2/20; C08F 220/14; C08F 220/20; C08F 212/36; C08F 216/125; B01J 13/16; B01J 13/206; B01J 13/14; B01J 14/08
See application file for complete search history.

(56) References Cited

U.S. PATENT DOCUMENTS

| | | | |
|---|---|---|---|
| 6,235,394 B1 | 5/2001 | Shimazawa et al. | |
| 6,509,384 B2 | 1/2003 | Kron et al. | |

FOREIGN PATENT DOCUMENTS

| | | | | |
|---|---|---|---|---|
| CN | 102746454 A | * | 10/2012 | |
| CN | 106832110 | | 6/2017 | |
| CN | 108047480 | | 5/2018 | |
| CN | 108084483 | | 5/2018 | |
| CN | 110922631 | | 3/2020 | |
| CN | 110922631 A | * | 3/2020 | ............ C08F 214/12 |
| CN | 112126007 | | 12/2020 | |
| CN | 112159547 | | 1/2021 | |
| EP | 1054034 | | 11/2000 | |
| EP | 1288272 | | 3/2003 | |

OTHER PUBLICATIONS

"International Search Report (Form PCT/ISA/210) of PCT/CN2021/101495," mailed on Sep. 7, 2021, with English translation thereof, pp. 1-4.
"Written Opinion of the International Searching Authority (Form PCT/ISA/237) of PCT/CN2021/101495," mailed on Sep. 7, 2021, pp. 1-6.
"Search Report of Europe Counterpart Application", issued on Aug. 20, 2024, p. 1-p. 6.
"Office Action of European Counterpart Application", issued on May 27, 2025, p. 1-p. 4.

* cited by examiner

HEAT-EXPANDABLE POLYVINYLIDENE CHLORIDE MICROSPHERE AND ITS PREPARATION METHOD

CROSS-REFERENCE TO RELATED APPLICATION

This application is a 371 of international application of PCT application serial no. PCT/CN2021/101495, filed on Jun. 22, 2021, which claims the priority benefit of China application no. 202010862651.7, filed on Aug. 25, 2020 and China application no. 202010862138.8, filed on Aug. 25, 2020. The entirety of each of the above mentioned patent applications is hereby incorporated by reference herein and made a part of this specification.

TECHNICAL FIELD

This disclosure belongs to the field of polymer materials, and specifically relates to a heat-expandable polyvinylidene chloride microsphere and its preparation method.

RELATED ART

Heat-expandable polyvinylidene chloride microspheres are one of the earliest materials used in the foaming plastics industry. They are prepared by suspension polymerization at beginning, where a monomer in which an initiator is dissolved and and a foaming agent are added to a reaction system at the same time and a foaming agent is coated in situ by suspension polymerization to finally form a microsphere having one or more foaming agents coated with a polymer shell. The preparation conditions affect the morphology and particle size of the prepared microspheres. By adjusting the reaction conditions, heat-expandable microspheres with different expansion properties can be prepared, which corresponds to different industrial applications.

U.S. Pat. Nos. 3,615,972, 3,945,956, 6,235,394, 6,509,384 and other patents disclose several methods for preparing heat-expandable microspheres for different applications. In 1961, the first microcapsule polymer synthesis technology was invented and applied to the production of tapes. Later, Dow researchers in the United States were inspired by this technology to develop a series of methods to prepare such heat-expandable microcapsules. Due to their huge applications in various industrial fields, many companies such as Dow Chemical, Bridgestone, Huntsman, General Electric, and Akzo Nobel have invested in manufacturing similar microspheres in the past 50 years. As disclosed by Donald et al., an aqueous phase and an oil phase were mixed by way of high-speed stirring to obtain a stable suspension, and then the stable suspension was prepared in a series of expandable microspheres by suspension polymerization.

However, due to the characteristics of suspension polymerization, the products prepared by conventional suspension polymerization methods generally have a large particle size and poor dispersion, which directly affects the quality and application of the products.

For example, CN102746454A discloses a heat-expandable resin microsphere having a foaming agent coated with a shell made of a thermoplastic resin. The resin microsphere can expand when heated, and its expansion ratio at maximum expansion is greater than 5. The aggregate of microspheres is the heat-expandable resin micropowder of this invention. Its preparation method is as follows. An oily material composed of at least one monomer and a foaming agent are dispersed in an aqueous system to form stable oil beads. When the oil beads are heated, the monomers polymerize to form microspheres having the foaming agent coated with a resin. The heat-expandable resin micropowder synthesized after adding monomers containing polar ends to the aqueous system has very good dispersibility in water. The disadvantage of this invention is that the synthesized heat-expandable resin microspheres have larger particles and low expansion ratio.

For example, CN106832110A discloses a heat-expandable microsphere composition having foaming properties at low temperatures and the heat-expandable microsphere composition is composed of ethylenically unsaturated monomers and a foaming agent, wherein the ethylenically unsaturated monomers include the following components: acrylonitrile, acrylate monomers and monomers containing polar ends. This invention mainly uses acrylate monomers instead of vinylidene chloride monomers in the prior art to obtain heat-expandable microspheres with a low Tstart (70 to 90° C.) and a high expansion performance. The obtained microspheres have a minimum particle size of 28 and the addition of ethylenically unsaturated monomers containing polar ends improves the dispersibility of the microspheres in water. The disadvantage of this invention is that the resulting microspheres have a larger particle size and poor barrier performance.

For example, CN102633936A discloses a heat-expandable thermoplastic microsphere, which is a microsphere of a shell-core structure with a thermoplastic polymer as a shell and a heat-expandable material as the core. The microsphere is prepared from ethylenic polymerizable monomers and heat-expandable materials through suspension polymerization. The foaming range of the microsphere is from 160 to 200° C., but the microsphere synthesized by the patent has a high initial expansion temperature and poor expansion properties in a low expansion temperature range.

SUMMARY OF INVENTION

In order to overcome the shortcomings of the prior art, one of the objectives of the present invention is to provide a heat-expandable polyvinylidene chloride microsphere. According to this disclosure, special functional monomers and additives are introduced into the formula, the polymerization formula is optimized, and the problems of large particle size and low expansion ratio existing in the prior art are solved. The heat-expandable polyvinylidene chloride microsphere of this disclosure has a small particle size and excellent foaming properties at low temperatures.

The second objective of this disclosure is to provide a preparation method of a heat-expandable polyvinylidene chloride microsphere, using a pickering emulsion suspension polymerization method to synthesize polyvinylidene chloride microspheres. With VDC as a main monomer, the preparation process is optimized by optimizing the temperature, pressure, feeding formula, feeding method and other factors that affect the reaction. This disclosure solves the problems of large particle size and low expansion ratio of microspheres in the prior art, and prepares a heat-expandable microsphere with small particle size and excellent foaming properties at low temperatures.

In order to achieve the above-mentioned first objective, a technical solution of this disclosure is as follows: a heat-expandable polyvinylidene chloride microsphere, by weight, including:

1000 to 2000 parts of a mixed monomer;
3 to 15 parts of a co-dispersing monomer;

250 to 550 parts of an aqueous-phase polymerization inhibitor;
20 to 100 parts of a dispersant;
5 to 15 parts of a crosslinking agent;
20 to 45 parts of an initiator; and
300 to 550 parts of a foaming agent.

In order to achieve the above-mentioned second objective, a technical solution of this disclosure is as follows: a preparation method of a heat-expandable polyvinylidene chloride microsphere, including the following steps:

(1) by weight, dissolving 250 to 550 parts of the aqueous-phase polymerization inhibitor, 150 to 350 parts of an aqueous solution of the dispersant with a concentration of 10 to 35% by mass, and 3 to 15 parts of the co-dispersing monomer in 5000 to 8000 parts of deionized water, adjusting pH of the mixed solution to 3 to 5, cooling to 0 to 10° C. to obtain an aqueous phase for later use;

(2) dissolving 5 to 15 parts of the crosslinking agent and 20 to 45 parts of the initiator in 1000 to 2000 parts of the mixed monomer, and cooling to 0 to 10° C. to obtain an oil phase for later use;

(3) mixing and homogenizing the above-mentioned aqueous phase and oil phase for 2 to 10 min at a stirring speed of 2000 to 8000 rpm to obtain a homogenized mixed solution;

(4) adding 300 to 550 parts of the foaming agent to the homogenized mixed solution obtained in step (3), and homogenizing for 2 to 10 min at 0.10 to 0.5 MPa, 2000 to 8000 rpm to obtain a homogenized mixed solution containing the foaming agent; and (5) reacting the homogenized mixed solution containing the foaming agent obtained in step (4) for 10 to 30 h at 50 to 90° C., 300 to 600 rpm; at the end of the reaction, cooling to room temperature, and filtering the resulting suspension to obtain filtrate; centrifuging and dehydrating the filtrate; and finally drying to obtain the heat-expandable polyvinylidene chloride microsphere product.

As a preferred embodiment of this disclosure, by weight, the co-dispersing monomer includes:
1 to 5 parts of a tetrahydrofuran solution of chloroplatinic acid;
50 to 70 parts of vinylpyrrolidone;
0.5 to 2.5 parts of zinc methacrylate; and
10 to 30 parts of dimethylallyl silane. The co-dispersing monomer is prepared as follows.

By weight, adding 1 to 5 parts of the tetrahydrofuran solution of chloroplatinic acid, 50 to 70 parts of vinylpyrrolidone, 0.5 to 2.5 parts of zinc methacrylate, and 10 to 30 parts of dimethylallylsilane to a reactor to carry out a hydrosilylation reaction at a temperature of 70 to 100° C. for 1 to 5 h to obtain the co-dispersing monomer.

As a preferred embodiment of this disclosure, the content of chloroplatinic acid in percentage by mass in the tetrahydrofuran solution of chloroplatinic acid is 1.0 to 5.0%.

As a preferred embodiment of this disclosure, by weight, the mixed monomer includes: 800 to 1200 parts of vinylidene chloride (VDC), 320 to 800 parts of acrylonitrile, and 160 to 320 parts of methyl methacrylate.

As a preferred embodiment of this disclosure, the foaming agent is at least one of isobutane, pentane, isopentane, hexane, isohexane, octane, and isoheptane.

As a preferred embodiment of this disclosure, the crosslinking agent is at least one of diethylene glycol divinyl ether, trimethylol methacrylate, divinylbenzene, and olefin derivatives containing double or triple bonds.

As a preferred embodiment of this disclosure, the initiator is at least one of azobisisobutyronitrile (AIBN), diisopropyl peroxydicarbonate (IPP), lauryl peroxide (LPO), and benzoyl peroxide (BPO).

As a preferred embodiment of this disclosure, the aqueous solution of the dispersant is at least one of an aqueous solution of colloidal silica, an aqueous solution of magnesium hydroxide, an aqueous solution of colloidal calcium carbonate, an aqueous solution of colloidal calcium phosphate, and an aqueous solution of colloidal aluminum hydroxide.

As a preferred embodiment of this disclosure, the aqueous-phase polymerization inhibitor is at least one of potassium dichromate, sodium nitrite, citric acid, and sodium chloride. The aqueous-phase polymerization inhibitor is more preferably a mixture of sodium chloride and potassium dichromate or sodium nitrite, and the content of sodium chloride in percentage by mass in the mixture is 99.0 to 99.7%.

This disclosure uses VDC as the main monomer, and optimizes the preparation process by optimizing the temperature, pressure, feeding formula, feeding method of the polymerization reaction and other factors affecting the reaction. The preparation process has good airtight barrier performance and polymerization stability, and the prepared microsphere product has excellent expansion properties in a low temperature range. The heat-expandable polyvinylidene chloride microsphere product prepared by this disclosure is regular white microparticles with smooth surface. The microsphere product has an average particle size distribution between 16 and 34 microns, a macroscopic volume expansion ratio greater than 45, and a thermal expansion response temperature between 80° C. and 128° C., a resin apparent density between 0.44 and 0.52 g/mL.

According to the preparation method of the heat-expandable polyvinylidene chloride microsphere of this disclosure, the vinylidene chloride monomer is adopted as the main polymerization monomer; a quantitative amount of the crosslinking agent and a quantitative amount of the initiator are mixed to form an oil phase; a quantitative amount of the dispersant, a quantitative amount of the co-dispersing monomer, a quantitative amount of the aqueous-phase polymerization inhibitor and a quantitative amount of water are mixed to obtain an aqueous phase; the aqueous phase, the oil phase and the foaming agent are dispersed by high-speed shear dispersion to form micron-sized droplets to react for a period of time under specific conditions by a pickering emulsion suspension polymerization method; after post-treatment, a microsphere of a core-shell structure is obtained.

Compared with the prior art, this disclosure has the following beneficial effects.

1. The average particle size is small and the barrier performance is good. The heat-expandable polyvinylidene chloride microsphere product prepared by the present disclosure is based on VDC as the main monomer and is a regular white microparticle with smooth surface. The microsphere product has narrow particle size distribution and good foaming agent encapsulation effect; its average particle size is distributed between 16 and 34 microns. The microsphere product has excellent barrier performance and also has better air tightness and longer storage shelf life than microspheres.

2. The volume expansion ratio is high. The vinyl pyrrolidone in the co-dispersing monomer can form a host-guest interaction with zinc methacrylate. In addition, the functionally active group pyrrolyl on vinyl pyrrolidone and the molecular chain of the polymer are linked by a chemical bond to act as a cross-linking agent to form a three-dimensional network structure, thereby improving the flexibility of the heat-expandable polyvinylidene chloride microsphere product and increase the volume expansion ratio. The expansion temperature and expansion ratio of the product can be controlled, the thermal expansion response temperature ranges from 80 to 128° C., the macroscopic volume expansion ratio is 45 to 62, and the apparent density of resin is between 0.44 and 0.52 g/mL.

3. The initial expansion temperature is low. The initial expansion temperature of the heat-expandable polyvinylidene chloride microsphere product of this disclosure is below 95° C. and is 80° C. at minimum. The microsphere product has excellent expansion performance in a low expansion temperature range. Therefore, the microsphere product has potential applications in the fields of insulation, decoration, packaging, and filling materials.

4. The traditional preparation of foamed microspheres is based on the suspension polymerization method, and the prepared microspheres have a large particle size. The heat-expandable polyvinylidene chloride microsphere of this disclosure prepared by the picking emulsion suspension polymerization method has smooth surface, regular shape, small particle size, narrow particle size distribution, and good foaming agent encapsulation effect. Its average particle size is distributed between 16 and 34 microns. The microsphere product has excellent barrier performance and also has better air tightness and longer storage shelf life than microspheres.

5. This disclosure adopts the pickering emulsion suspension polymerization method, optimizes the preparation process by optimizing the temperature, pressure, feeding formula and feeding method of the polymerization reaction and other factors that affect the reaction. The heat-expandable microsphere prepared has good airtight barrier performance and a low temperature range. The initial expansion temperature is 80° C. at minimum, and the macroscopic volume expansion ratio is greater than 45.

6. The process is simple, environmentally friendly, and the preparation process has good airtight barrier performance and polymerization stability.

DESCRIPTION OF EMBODIMENTS

Figure 1:
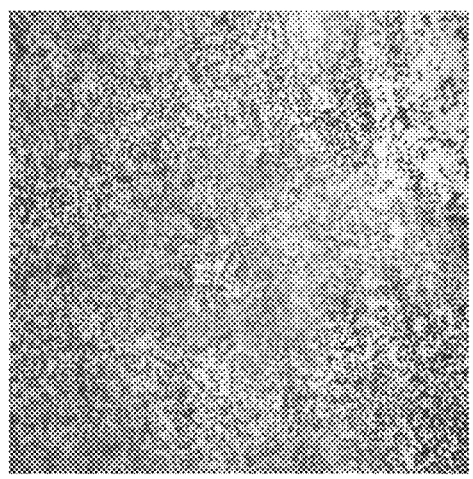
FIG. 1 is an optical micrograph of a product in example 1.
Figure 2:
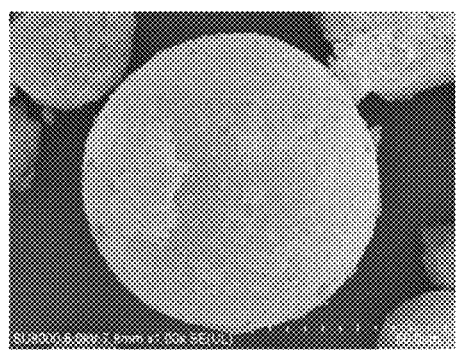
FIG. 2 is a scanning electron micrograph of the product in example 1.
Figure 3:
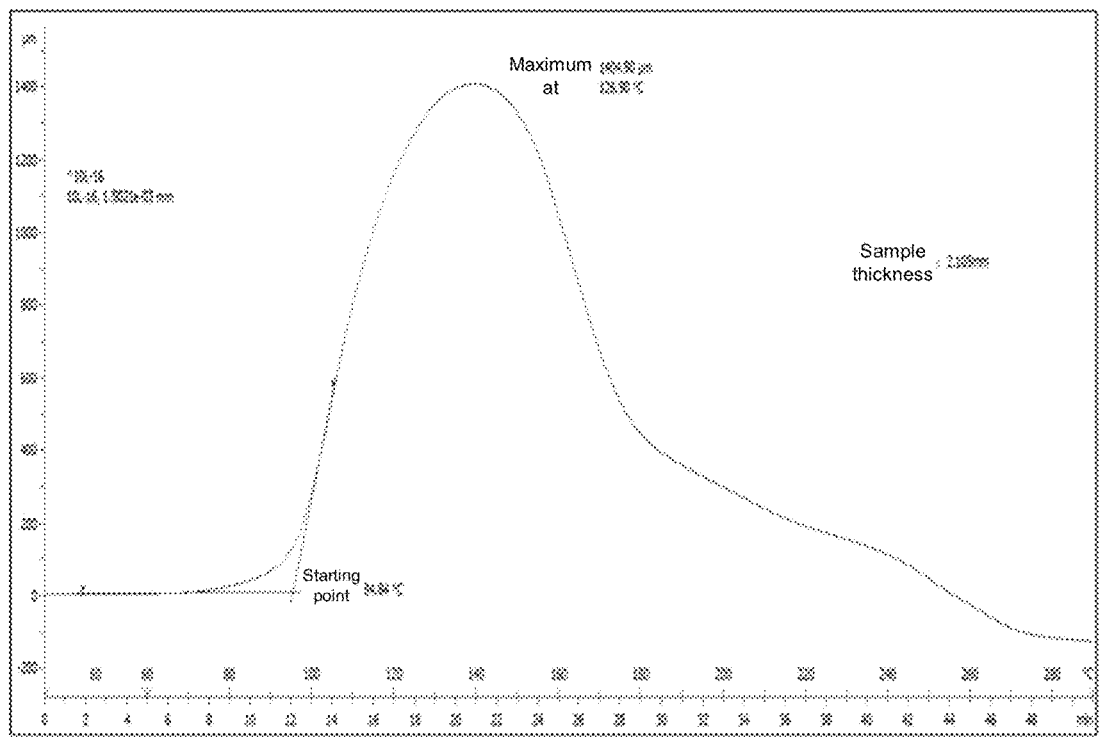
FIG. 3 is a thermal expansion test curve of the product in example 1.

In order to make the objectives, technical solutions and advantages of this disclosure clearer, this disclosure will be further described in detail below in conjunction with embodiments. It should be understood that the following description is only used to explain this disclosure, and is not intended to limit this disclosure.

The prepared microsphere is characterized using the following analysis methods and testing devices.

(1) Average Particle Size

The particle size distribution of the microsphere was measured by the laser particle size analyzer Mastersizer-v3.62 produced by Malvern Company. The measured particle size was Dv50, and the span particle size distribution index was then calculated.

(2) Expansion Temperature

The thermal expansion performance of the microsphere was measured by the TMA-Q400 thermomechanical analyzer produced by TA Instrument Company. The test temperature was within a range of 20 to 300° C., the heating rate was 20° C./min, and a constant force of 0.01 N was applied to the sample. The change curve of sample volume with temperature increase was recorded, and the initial expansion temperature Ts and the maximum expansion temperature Tm were thus obtained.

(3) Volume Expansion Ratio 2 mL of the dried sample was placed in an oven and rested for 20 min at a constant temperature Tm. The expanded microspheres were transferred to a graduated cylinder to calculate the macroscopic volume expansion ratio.

(4) Apparent Density

The test was carried out with reference to the standard GB/T 23652-2009. The weight of the compacted resin in a 200 mL graduated cylinder was calculated; and the apparent density of the sample was then calculated, expressed in g/mL.

Example 1

A heat-expandable polyvinylidene chloride microsphere, based on 1 g as a part, reaction raw materials including:
5000 g of deionized water;
an aqueous-phase polymerization inhibitor (300 g of sodium chloride and 1 g of sodium nitrite);
a dispersant (200 g of an aqueous dispersion of magnesium hydroxide with a concentration of 10% by mass);
a crosslinking agent (6 g of 1,4-butanediol dimethacrylate);
an initiator (30 g of AIBN);
a mixed monomer (800 g of vinylidene chloride, 800 g of acrylonitrile, and 160 g of methyl methacrylate);
a foaming agent (400 g of isobutene); and
5 g of a co-dispersing monomer.
By weight, the co-dispersing monomer includes:
1 part of a tetrahydrofuran solution of chloroplatinic acid (containing 1.2% of chloroplatinic acid by mass), 50 parts of vinylpyrrolidone, 0.5 part of zinc methacrylate, and 10 parts of dimethylallylsilane.

The heat-expandable polyvinylidene chloride microsphere was prepared as follows: 1 g of a tetrahydrofuran solution of chloroplatinic acid (containing 1.2% of chloroplatinic acid by mass), 50 g of vinylpyrrolidone, 0.5 g of zinc methacrylate, and 10 g of dimethylallylsilane were added to a reactor to carry out a hydrosilylation reaction at 85° C. for 1 h to obtain 33.8 g of a co-dispersing monomer, and 5 g of the co-dispersing monomer was taken for later use. 300 g of sodium chloride, 1 g of sodium nitrite, 200 g of an aqueous dispersion of magnesium hydroxide with a concentration of 10% by mass, and 5 g of the co-dispersing monomer were then dissolved in 5000 g of deionized water sequentially, an aqueous solution of citric acid was then added dropwise with stirring until pH=3.5, and the mixed solution was then cooled in an ice water bath to obtain an aqueous phase for later use. 6 g of 1,4-butanediol dimethacrylate and 30 g of AIBN were dissolved into a mixed monomer, the mixed monomer including 800 g of vinylidene chloride, 800 g of acrylonitrile, and 160 g of methyl methacrylate, and the obtained solution was then cooled in an ice water bath to obtain an oil phase for later use. The aqueous phase and the oil phase were pumped into the vacuum reactor in turn and stirred for 5 min at 3000 rpm to be homogenized. 400 g of isobutane was then added by virtue of a pressure difference, the reactor was then pressurized to 0.20 MPa by virtue of the pressure of a nitrogen cylinder and homogenization was carried out for 5 min at 3000 rpm. Then, the stirring rate was reduced to 400 rpm and the temperature in the reactor was controlled at 60° C. to carry out a reaction for 20 h. At the end of the reaction, the reaction solution was cooled to room temperature, the resulting suspension was filtered with 100-mesh gauze, and the obtained filtrate was centrifuged and dehydrated by a 500-mesh filter bag. Finally the collected wet material was dried in a fluidized bed at room temperature to obtain regular white vinylidene chloride microspheres with a smooth surface.

Example 2

5 g of a tetrahydrofuran solution of chloroplatinic acid (containing 4.2% of chloroplatinic acid by mass), 70 g of vinylpyrrolidone, 2.4 g of zinc methacrylate, and 30 g of dimethylallylsilane were added to a reactor to carry out a hydrosilylation reaction at 93° C. for 5 h to obtain 58 g of a co-dispersing monomer, and 12 g of the co-dispersing monomer was taken for later use. 500 g of sodium chloride, 4 g of sodium nitrite, 320 g of an aqueous dispersion of colloidal silica with a concentration of 30% by mass, and 12 g of the co-dispersing monomer were then dissolved in 8000 g of deionized water sequentially, an aqueous solution of citric acid was then added dropwise with stirring until pH=4, and the mixed solution was then cooled in an 8° C. refrigerator to obtain an aqueous phase for later use. 12 g of 1,4-butanediol dimethacrylate and 43 g of AIBN were dissolved into a mixed monomer, the mixed monomer including 1200 g of vinylidene chloride, 320 g of acrylonitrile, and 160 g of methyl methacrylate, and the obtained solution was then cooled in an 8° C. refrigerator to obtain an oil phase for later use. The aqueous phase and the oil phase were pumped into the vacuum reactor in turn and stirred for 3 min at 4000 rpm to be homogenized. 490 g of isobutane was then added by virtue of a pressure difference, the reactor was then pressurized to 0.32 MPa by virtue of the pressure of a nitrogen cylinder and homogenization was carried out for 3 min at 3000 rpm. Then, the stirring rate was reduced to 500 rpm and the temperature in the reactor was controlled at 70° C. to carry out a reaction for 28 h. At the end of the reaction, the reaction solution was cooled to room temperature, the pressure was reduced slowly, the resulting suspension was filtered with 100-mesh gauze, and the obtained filtrate was centrifuged and dehydrated by a 500-mesh filter bag. Finally the collected wet material was dried in a fluidized bed at room temperature to obtain regular white vinylidene chloride microspheres with a smooth surface.

Example 3

2.5 g of a tetrahydrofuran solution of chloroplatinic acid (containing 2.2% of chloroplatinic acid by mass), 56 g of vinylpyrrolidone, 1.5 g of zinc methacrylate, and 16 g of dimethylallylsilane were added to a reactor to carry out a hydrosilylation reaction at 88° C. for 3 h to obtain 42.6 g of a co-dispersing monomer, and 9 g of the co-dispersing monomer was taken for later use. 380 g of sodium chloride, 1.9 g of sodium nitrite, 290 g of an aqueous dispersion of colloidal silica with a concentration of 16% by mass, and 9 g of the co-dispersing monomer were then dissolved in 6400 g of deionized water sequentially, an aqueous solution of citric acid was then added dropwise with stirring until pH=3, and the mixed solution was then cooled in a 5° C. refrigerator to obtain an aqueous phase for later use. 10 g of 1,4-butanediol dimethacrylate and 38 g of AIBN were dissolved into a mixed monomer, the mixed monomer including 960 g of vinylidene chloride, 320 g of acrylonitrile, and 320 g of methyl methacrylate, and the obtained solution was then cooled in a 5° C. refrigerator to obtain an oil phase for later use. The aqueous phase and the oil phase were pumped into the vacuum reactor in turn and stirred for 2 min at 6000 rpm to be homogenized. 440 g of isobutane was then added by virtue of a pressure difference, the reactor was then pressurized to 0.25 MPa by virtue of the pressure of a nitrogen cylinder and homogenization was carried out for 2 min at 6000 rpm. Then, the stirring rate was reduced to 450 rpm and the temperature in the reactor was controlled at 65° C. to carry out a reaction for 22 h. At the end of the reaction, the reaction solution was cooled to room temperature, the pressure was reduced slowly, the resulting suspension was filtered with 100-mesh gauze, and the obtained filtrate was centrifuged and dehydrated by a 500-mesh filter bag. Finally the collected wet material was dried in a fluidized bed at room temperature to obtain regular white vinylidene chloride microspheres with a smooth surface.

Example 4

2.5 g of a tetrahydrofuran solution of chloroplatinic acid (containing 3.1% of chloroplatinic acid by mass), 56 g of vinylpyrrolidone, 1.5 g of zinc methacrylate, and 16 g of dimethylallylsilane were added to a reactor to carry out a hydrosilylation reaction at 85° C. for 3 h to obtain 42.1 g of a co-dispersing monomer, and 7.4 g of the co-dispersing monomer was taken for later use. 380 g of sodium chloride, 1.9 g of sodium nitrite, 290 g of an aqueous dispersion of colloidal silica with a concentration of 16% by mass, and 7.4 g of the co-dispersing monomer were then dissolved in 6400 g of deionized water sequentially, an aqueous solution of citric acid was then added dropwise with stirring until pH=3, and the mixed solution was then cooled in an ice water bath to obtain an aqueous phase for later use. 12 g of diethylene glycol divinyl ether and 36 g of diisopropyl peroxydicarbonate (IPP) were dissolved into a mixed monomer, the mixed monomer including 800 g of vinylidene chloride, 640 g of acrylonitrile, and 160 g of methyl methacrylate, and the obtained solution was then cooled in an ice water bath to obtain an oil phase for later use. The aqueous phase and the oil phase were pumped into the vacuum reactor in turn and stirred for 4 min at 5000 rpm to be homogenized. 380 g of isobutane and 20 g of hexane were then added by virtue of a pressure difference, the reactor was then pressurized to 0.25 MPa by virtue of the pressure of a nitrogen cylinder and homogenization was carried out for 4 min at 5000 rpm. Then, the stirring rate was reduced to 450 rpm and the temperature in the reactor was controlled at 65° C. to carry out a reaction for 22 h. At the end of the reaction, the reaction solution was cooled to room temperature, the pressure was reduced slowly, the resulting suspension was filtered with 100-mesh gauze, and the obtained filtrate was centrifuged and dehydrated by a 500-mesh filter bag. Finally the collected wet material was dried in a fluidized bed at room temperature to obtain regular white vinylidene chloride microspheres with a smooth surface.

Example 5

2.5 g of a tetrahydrofuran solution of chloroplatinic acid (containing 2.5% of chloroplatinic acid by mass), 56 g of vinylpyrrolidone, 1.5 g of zinc methacrylate, and 16 g of dimethylallylsilane were added to a reactor to carry out a hydrosilylation reaction at 88° C. for 3 h to obtain 39.5 g of a co-dispersing monomer, and 7.4 g of the co-dispersing monomer was taken for later use. 380 g of sodium chloride, 1.9 g of sodium nitrite, 200 g of an aqueous dispersion of methylcellulose with a concentration of 16% by mass, and 7.4 g of the co-dispersing monomer were then dissolved in 6400 g of deionized water sequentially, an aqueous solution of citric acid was then added dropwise with stirring until pH=4, and the mixed solution was then cooled in an ice water bath to obtain an aqueous phase for later use. 10 g of 1,4-butanediol dimethacrylate and 35 g of lauryl peroxide (LPO) were dissolved into a mixed monomer, the mixed monomer including 800 g of vinylidene chloride, 800 g of acrylonitrile, and 160 g of methyl methacrylate, and the obtained solution was then cooled in an ice water bath to obtain an oil phase for later use. The aqueous phase and the oil phase were pumped into the vacuum reactor in turn and stirred for 3.5 min at 4500 rpm to be homogenized. 380 g of isobutane and 40 g of octane were then added by virtue of a pressure difference, the reactor was then pressurized to 0.25 MPa by virtue of the pressure of a cylinder and homogenization was carried out for 3.5 min at 4500 rpm. Then, the stirring rate was reduced to 450 rpm and the temperature in the reactor was controlled at 65° C. to carry out a reaction for 22 h. At the end of the reaction, the reaction solution was cooled to room temperature, the pressure was reduced slowly, the resulting suspension was filtered with 100-mesh gauze, and the obtained filtrate was centrifuged and dehydrated by a 500-mesh filter bag. Finally the collected wet material was dried in a fluidized bed at room temperature to obtain regular white vinylidene chloride microspheres with a smooth surface.

Example 6

2.5 g of a tetrahydrofuran solution of chloroplatinic acid (containing 2.2% of chloroplatinic acid by mass), 56 g of vinylpyrrolidone, 1.5 g of zinc methacrylate, and 16 g of dimethylallylsilane were added to a reactor to carry out a hydrosilylation reaction at 88° C. for 3 h to obtain 41.8 g of a co-dispersing monomer, and 7.4 g of the co-dispersing monomer was taken for later use. 380 g of sodium chloride, 1.9 g of sodium nitrite, 290 g of an aqueous dispersion of hydroxypropylmethylcellulose with a concentration of 16% by mass, and 7.4 g of the co-dispersing monomer were then dissolved in 6400 g of deionized water sequentially, an aqueous solution of citric acid was then added dropwise with stirring until pH=3, and the mixed solution was then cooled in an ice water bath to obtain an aqueous phase for later use. 10 g of divinylbenzene and 38 g of benzoyl peroxide were dissolved into a mixed monomer, the mixed monomer including 800 g of vinylidene chloride, 800 g of acrylonitrile, and 160 g of methyl methacrylate, and the obtained solution was then cooled in an ice water bath to obtain an oil phase for later use. The aqueous phase and the oil phase were pumped into the vacuum reactor in turn and stirred for 3 min at 4000 rpm to be homogenized. 400 g of isobutane and 20 g of isoheptane were then added by virtue of a pressure difference, the reactor was then pressurized to 0.25 MPa by virtue of the pressure of a nitrogen cylinder and homogenization was carried out for 3 min at 4000 rpm. Then, the stirring rate was reduced to 450 rpm and the temperature in the reactor was controlled at 65° C. to carry out a reaction for 22 h. At the end of the reaction, the reaction solution was cooled to room temperature, the pressure was reduced slowly, the resulting suspension was filtered with 100-mesh gauze, and the obtained filtrate was centrifuged and dehydrated by a 500-mesh filter bag. Finally the collected wet material was dried in a fluidized bed at room temperature to obtain regular white vinylidene chloride microspheres with a smooth surface.

Example 7

2.5 g of a tetrahydrofuran solution of chloroplatinic acid (containing 2.2% of chloroplatinic acid by mass), 56 g of vinylpyrrolidone, 1.5 g of zinc methacrylate, and 16 g of dimethylallylsilane were added to a reactor to carry out a hydrosilylation reaction at 88° C. for 3 h to obtain 47 g of a co-dispersing monomer, and 7.4 g of the co-dispersing monomer was taken for later use. 380 g of sodium chloride, 1.9 g of potassium dichromate, 290 g of an aqueous dispersion of carboxypropyl cellulose with a concentration of 16% by mass, and 7.4 g of the co-dispersing monomer were then dissolved in 6400 g of deionized water sequentially, an aqueous solution of citric acid was then added dropwise with stirring until pH=4, and the mixed solution was then cooled in an ice water bath to obtain an aqueous phase for later use. 10 g of 1,4-butanediol dimethacrylate and 38 g of AIBN were dissolved into a mixed monomer, the mixed monomer including 800 g of vinylidene chloride, 800 g of acrylonitrile, and 160 g of methyl methacrylate, and the obtained solution was then cooled in an ice water bath to obtain an oil phase for later use. The aqueous phase and the oil phase were pumped into the vacuum reactor in turn and stirred for 2.5 min at 5500 rpm to be homogenized. 220 g of isobutane and 220 g of isopentane were then added by virtue of a pressure difference, the reactor was then pressurized to 0.25 MPa by virtue of the pressure of a nitrogen cylinder and homogenization was carried out for 2 min at 5500 rpm. Then, the stirring rate was reduced to 450 rpm and the temperature in the reactor was controlled at 65° C. to carry out a reaction for 22 h. At the end of the reaction, the reaction solution was cooled to room temperature, the pressure was reduced slowly, the resulting suspension was filtered with 100-mesh gauze, and the obtained filtrate was centrifuged and dehydrated by a 500-mesh filter bag. Finally the collected wet material was dried in a fluidized bed at room temperature to obtain regular white vinylidene chloride microspheres with a smooth surface.

Example 8

2.5 g of a tetrahydrofuran solution of chloroplatinic acid (containing 2.2% of chloroplatinic acid by mass), 56 g of vinylpyrrolidone, 2.0 g of zinc methacrylate, and 16 g of dimethylallylsilane were added to a reactor to carry out a hydrosilylation reaction at 90° C. for 4 h to obtain 40.5 g of a co-dispersing monomer, and 10 g of the co-dispersing monomer was taken for later use. 380 g of sodium chloride, 1.9 g of sodium nitrite, 290 g of an aqueous dispersion of colloidal silica with a concentration of 16% by mass, and 10 g of the co-dispersing monomer were then dissolved in 6400 g of deionized water sequentially, an aqueous solution of citric acid was then added dropwise with stirring until pH=4, and the mixed solution was then cooled in an ice water bath to obtain an aqueous phase for later use. 10 g of 1,4-butanediol dimethacrylate and 38 g of AIBN were dissolved into mixed monomer including 960 g of vinylidene chloride, 320 g of acrylonitrile, and 320 g of methyl methacrylate, and the obtained solution was then cooled in an ice water bath to obtain an oil phase for later use. The aqueous phase and the oil phase were pumped into the vacuum reactor in turn and stirred for 2 min at 7000 rpm to be homogenized. 330 g of isobutane and 110 g of isopentane were then added by virtue of a pressure difference, the reactor was then pressurized to 0.25 MPa by virtue of the pressure of a nitrogen cylinder and homogenization was carried out for 2 min at 7000 rpm. Then, the stirring rate was reduced to 550 rpm and the temperature in the reactor was controlled at 75° C. to carry out a reaction for 15 h. At the end of the reaction, the reaction solution was cooled to room temperature, the pressure was reduced slowly, the resulting suspension was filtered with 100-mesh gauze, and the obtained filtrate was centrifuged and dehydrated by a 500-mesh filter bag. Finally the collected wet material was dried in a fluidized bed at room temperature to obtain regular white vinylidene chloride microspheres with a smooth surface.

Comparative Example 1

The raw material composition and preparation method of a polyvinylidene chloride microsphere in this example are the same as those in Example 1, except that the mixed monomer includes 500 g of vinylidene chloride, 300 g of acrylonitrile and 100 g of methyl methacrylate.

As a result, regular white powdery vinylidene chloride microspheres with smooth surface were obtained.

Comparative Example 2

The raw material composition and preparation method of a polyvinylidene chloride microsphere in this example are the same as those in Example 1, except that the mixed monomer includes 1500 g of vinylidene chloride, 900 g of acrylonitrile and 100 g of methyl methacrylate.

As a result, regular white powdery vinylidene chloride microspheres with smooth surface were obtained.

Comparative Example 3

The raw material composition and preparation method of a polyvinylidene chloride microsphere in this example are the same as those in Example 1, except that:

the co-dispersing monomer was prepared as follows.

1 g of a tetrahydrofuran solution of chloroplatinic acid (containing 1.2% of chloroplatinic acid by mass), 50 g of vinylpyrrolidone, and 10 g of dimethylallylsilane were added to a reactor to carry out a hydrosilylation reaction at 85° C. for 1 h to obtain 30.5 g of a co-dispersing monomer, and 5 g of the co-dispersing monomer was taken for later use.

As a result, regular white powdery vinylidene chloride microspheres with smooth surface were obtained.

Comparative Example 4

The raw material composition and preparation method of a polyvinylidene chloride microsphere in this example are the same as those in Example 1, except that:

the co-dispersing monomer was prepared as follows.

1 g of a tetrahydrofuran solution of chloroplatinic acid (containing 1.2% of chloroplatinic acid by mass), 0.5 g of zinc methacrylate, and 10 g of dimethylallylsilane were added to a reactor to carry out a hydrosilylation reaction at 85° C. for 1 h to obtain 6.9 g of a co-dispersing monomer, and 5 g of the co-dispersing monomer was taken for later use.

As a result, regular white powdery vinylidene chloride microspheres with smooth surface were obtained.

The test results of Examples 1 to 8 and Comparative Examples 1 to 4 are shown in Table 1.

TABLE 1

Test results of Examples and Comparative Examples

| Properties of heat-expandable microspheres | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| Average particle diameter (um) | 16 | 18 | 27 | 29 | 31 | 33 | 34 | 32 | 23 | 19 | 40 | 43 |
| Initial expansion temperature (° C.) | 90 | 80 | 85 | 85 | 87 | 93 | 92 | 95 | 105 | 72 | 85 | 84 |
| Maximum expansion temperature (° C.) | 120 | 115 | 120 | 115 | 125 | 122 | 125 | 128 | 113 | 130 | 110 | 104 |
| Volume expansion ratio | 50 | 45 | 50 | 45 | 46 | 47 | 55 | 62 | 20 | 19 | 17 | 23 |
| Resin apparent density (g/mL) | 0.48 | 0.52 | 0.51 | 0.49 | 0.48 | 0.48 | 0.44 | 0.46 | 0.41 | 0.54 | 0.47 | 0.47 |

According to the results described in the above table, in various embodiments of this disclosure, the heat-expandable microspheres with different foaming temperature ranges are prepared, indicating that the heat-expandable microspheres of this disclosure have excellent expansion properties. In Comparative Examples 1 to 2, the dosage of the mixed monomer is changed. The dosage of VDC is higher than the range of the examples, the prepared microspheres have a low initial expansion temperature and a low volume expansion ratio; the dosage of VDC is lower than the implementation range, and the prepared microspheres have a high initial expansion temperature and a low volume expansion ratio. In addition, in Comparative Example 3 to 4, the formulation of the co-dispersing monomer is changed to prepare a microsphere with a large particle size and a low volume expansion ratio.

What is claimed is:

1. A heat-expandable polyvinylidene chloride microsphere composition, by weight, comprising:
   1000 to 2000 parts of a mixed monomer, wherein by weight, the mixed monomer comprises: 800 to 1200 parts of vinylidene chloride, 320 to 800 parts of acrylonitrile, and 160 to 320 parts of methyl methacrylate;
   3 to 15 parts of a co-dispersing monomer, wherein by weight, the co-dispersing monomer comprises:
      1 to 5 parts of a tetrahydrofuran solution of chloroplatinic acid;
      50 to 70 parts of vinylpyrrolidone;
      0.5 to 2.5 parts of zinc methacrylate; and
      10 to 30 parts of dimethylallyl silane;
   250 to 550 parts of an polymerization inhibitor;
   20 to 100 parts of a dispersant;
   5 to 15 parts of a crosslinking agent;
   20 to 45 parts of an initiator; and
   300 to 550 parts of a foaming agent.

2. The heat-expandable polyvinylidene chloride microsphere composition according to claim 1, wherein a content of chloroplatinic acid in percentage by mass in the tetrahydrofuran solution of chloroplatinic acid is 1.0 to 5.0%.

3. The heat-expandable polyvinylidene chloride microsphere composition according to claim 1, wherein the foaming agent is at least one of isobutane, pentane, isopentane, hexane, isohexane, octane, and isoheptane.

4. The heat-expandable polyvinylidene chloride microsphere composition according to claim 1, wherein the crosslinking agent is at least one of diethylene glycol divinyl ether, trimethylolpropane trimethacrylate, divinylbenzene, and olefin derivatives containing double or triple bonds.

5. The heat-expandable polyvinylidene chloride microsphere composition according to claim 1, wherein the initiator is at least one of azobisisobutyronitrile, diisopropyl peroxydicarbonate, lauryl peroxide, and benzoyl peroxide.

6. The heat-expandable polyvinylidene chloride microsphere composition according to claim 1, wherein the dispersant is at least one of colloidal silica, magnesium hydroxide, methyl cellulose, hydroxypropyl methyl cellulose, and carboxypropyl cellulose.

7. The heat-expandable polyvinylidene chloride microsphere composition according to claim 1, wherein the polymerization inhibitor is at least one of potassium dichromate, sodium nitrite, citric acid, and sodium chloride.

8. The heat-expandable polyvinylidene chloride microsphere composition according to claim 7, wherein the polymerization inhibitor is a mixture of sodium chloride and potassium dichromate or sodium nitrite, and a content of sodium chloride in percentage by mass in the mixture is 99.0 to 99.7%.

9. A preparation method of a heat-expandable polyvinylidene chloride microsphere composition, comprising the following steps:
   (1) by weight, dissolving 250 to 550 parts of an polymerization inhibitor, 20 to 100 parts of an aqueous solution of a dispersant with a concentration of 10 to 35% by mass, and 3 to 15 parts of a co-dispersing monomer in 5000 to 8000 parts of deionized water, adjusting pH of the mixed solution to 3 to 5, cooling to 0 to 10° C. to obtain an aqueous phase for later use, wherein the co-dispersing monomer is prepared as follows:
   by weight, adding 1 to 5 parts of the tetrahydrofuran solution of chloroplatinic acid, 50 to 70 parts of vinylpyrrolidone, 0.5 to 2.5 parts of zinc methacrylate, and 10 to 30 parts of dimethylallylsilane to a reactor to carry out a hydrosilylation reaction at a temperature of 70 to 100° C. for 1 to 5 h to obtain the co-dispersing monomer;
   (2) dissolving 5 to 15 parts of a crosslinking agent and 20 to 45 parts of an initiator in 1000 to 2000 parts of the mixed monomer, and cooling to 0 to 10° C. to obtain an oil phase for later use, wherein by weight, the mixed monomer comprises: 800 to 1200 parts of vinylidene chloride, 320 to 800 parts of acrylonitrile, and 160 to 320 parts of methyl methacrylate;
   (3) mixing and homogenizing the aqueous phase and the oil phase for 2 to 10 min at a stirring speed of 2000 to 8000 rpm to obtain a homogenized mixed solution;
   (4) adding 300 to 550 parts of a foaming agent to the homogenized mixed solution obtained in step (3), and homogenizing for 2 to 10 min at 0.10 to 0.5 MPa, 2000 to 8000 rpm to obtain a homogenized mixed solution containing the foaming agent; and
   (5) allowing the homogenized mixed solution containing the foaming agent obtained in step (4) to react for 10 to 30 h at 50 to 90° C., 300 to 600 rpm; at the end of the reaction, cooling to room temperature, and filtering the resulting suspension to obtain filtrate; centrifuging and dehydrating the filtrate; and finally drying to obtain the heat-expandable polyvinylidene chloride microsphere product.

* * * * *